(No Model.) 4 Sheets—Sheet 2.
R. EICKEMEYER.
FRAME FOR WINDING ARMATURE COILS.
No. 377,997. Patented Feb. 14, 1888.
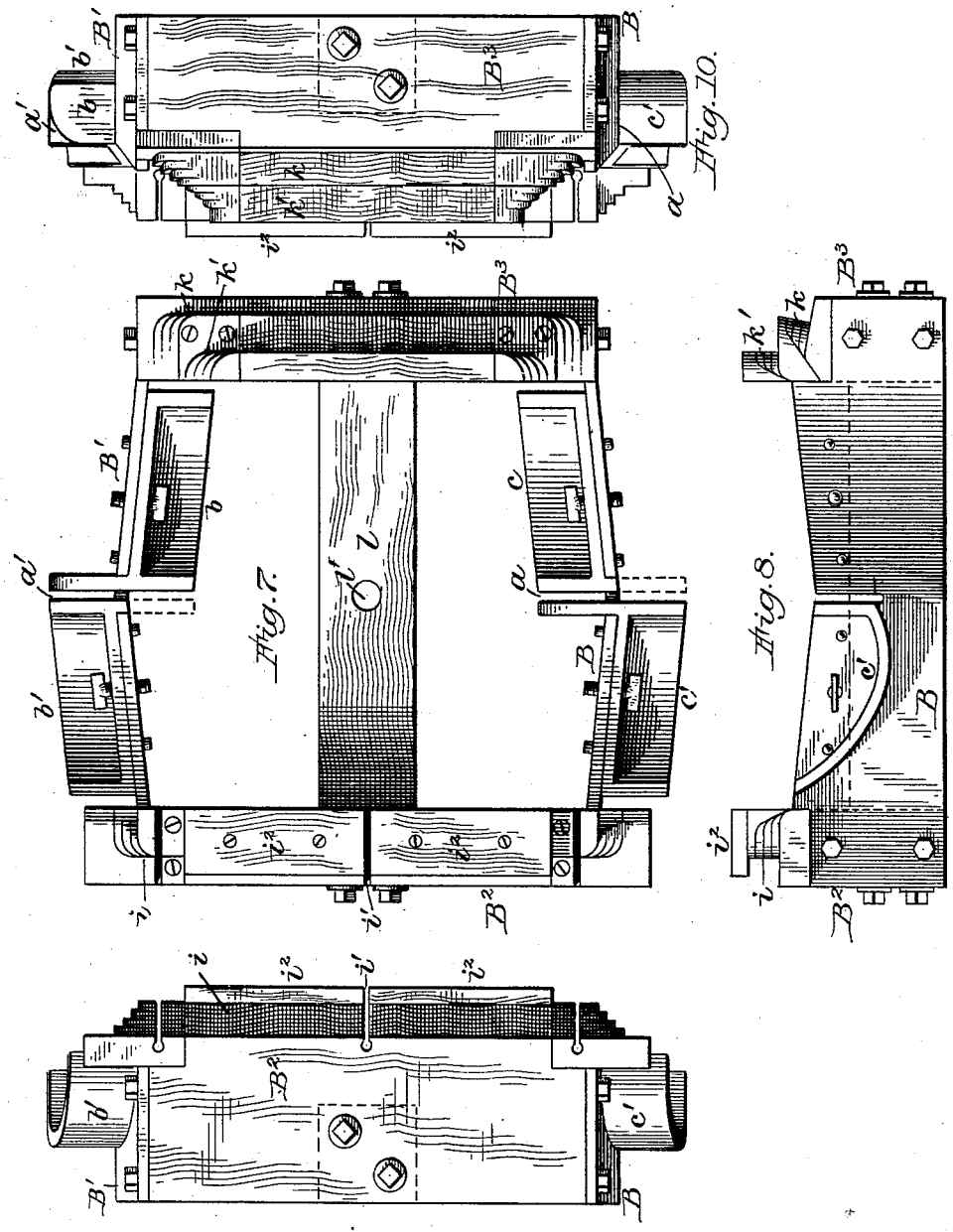

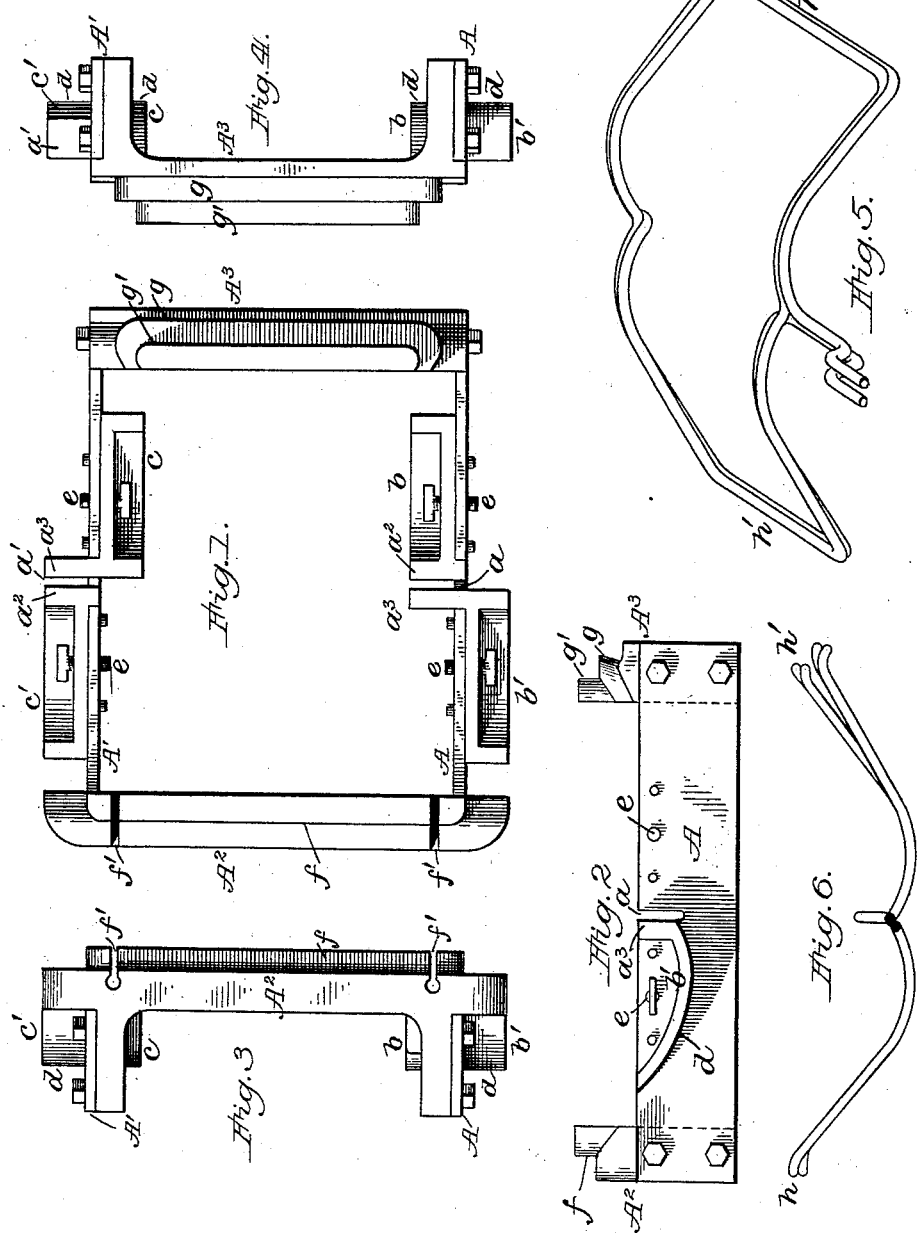

(No Model.) 4 Sheets—Sheet 3.
R. EICKEMEYER.
FRAME FOR WINDING ARMATURE COILS.
No. 377,997. Patented Feb. 14, 1888.
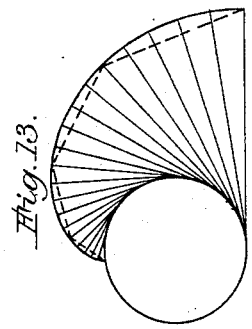
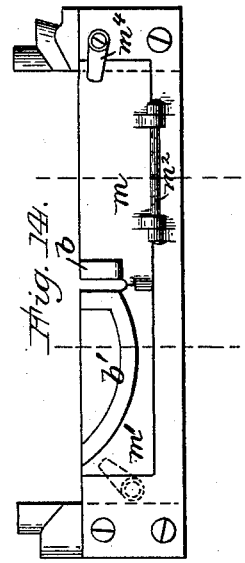
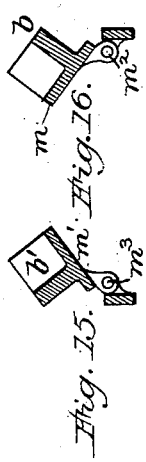
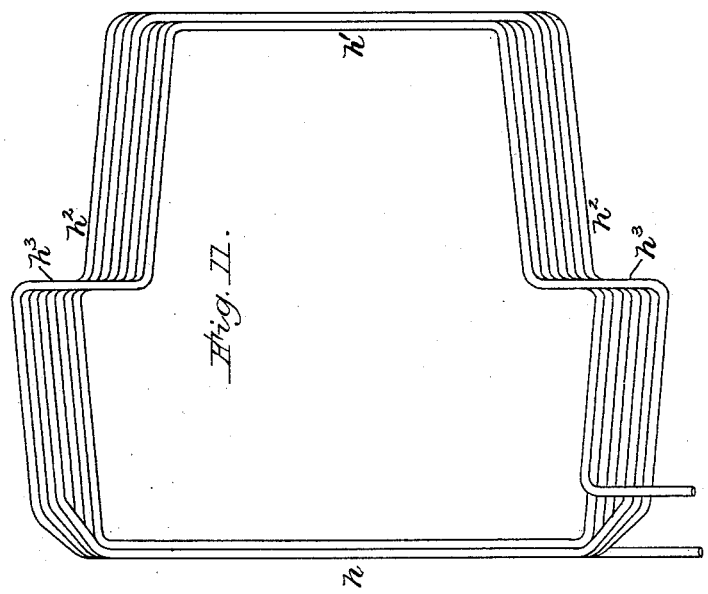
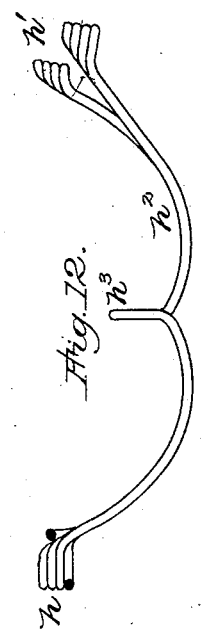

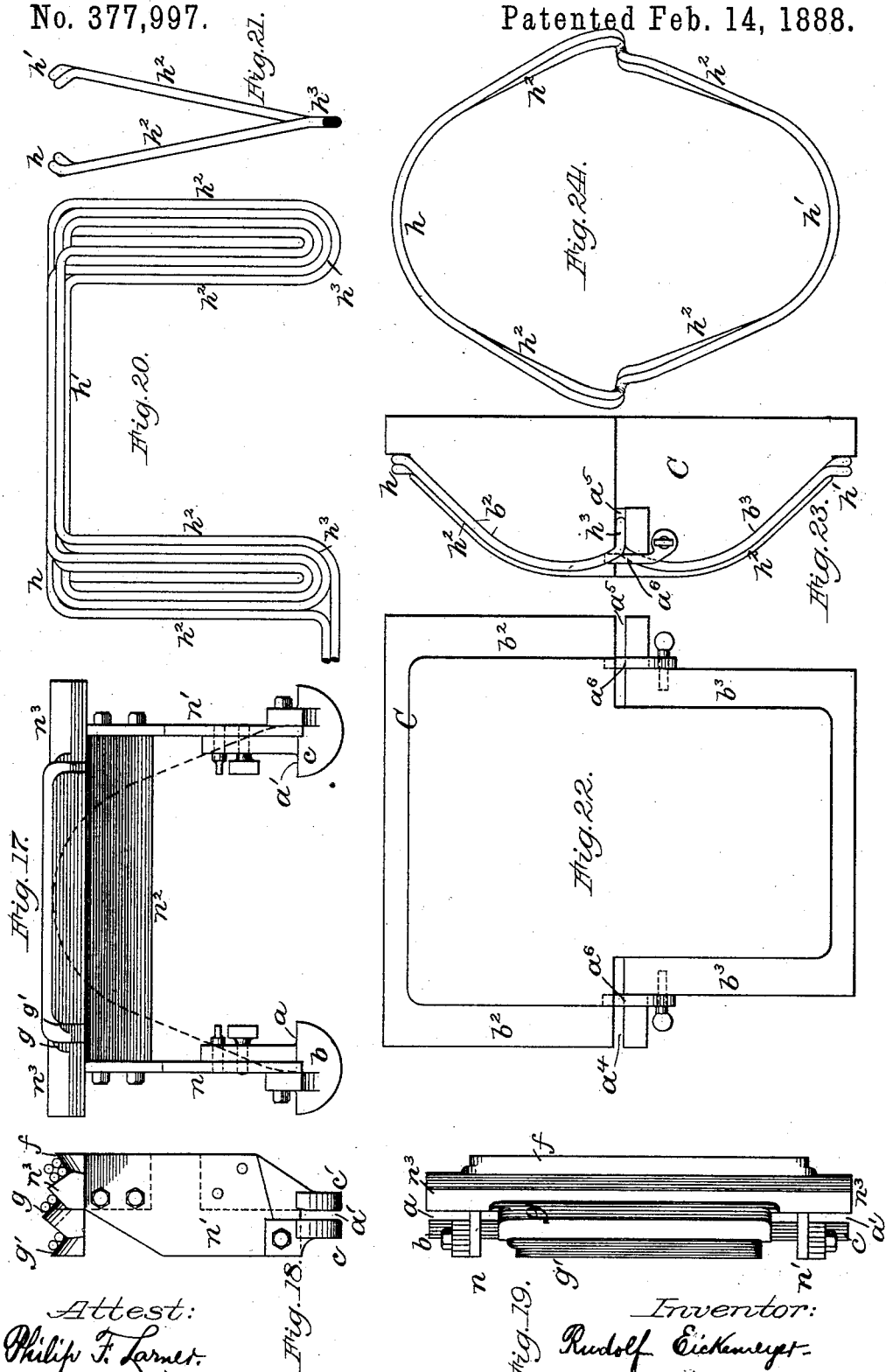

UNITED STATES PATENT OFFICE.

RUDOLF EICKEMEYER, OF YONKERS, NEW YORK.

FRAME FOR WINDING ARMATURE-COILS.

SPECIFICATION forming part of Letters Patent No. 377,997, dated February 14, 1888.

Application filed December 31, 1887. Serial No. 259,498. (No model.)

*To all whom it may concern:*

Be it known that I, RUDOLF EICKEMEYER, of Yonkers, in the county of Westchester and State of New York, have invented certain new and useful Coil-Winding Frames or Formers for Use in the Manufacture of Armature-Coils Employed in Dynamo-Electric Machines; and I do hereby declare that the following specification, taken in connection with the drawings furnished and forming a part of the same, is a clear, true, and complete description of the several features of my invention.

In my application for Letters Patent filed May 11, 1887, Serial No. 237,862, I disclosed certain improvements in dynamo-electric machines involving novel armature-coils devised by me, and for the better illustration of the said improvements I disclosed in said application certain coiling-frames or "formers," also devised by me for use in the construction of said novel coils.

It is to be understood that the prime object of my novel coil-winding frames or formers is to enable the accurate and convenient development of counterpart armature coils or windings which can be readily applied to or removed from an armature of a dynamo-electric machine, and in which the crossing of the wire in any one coil will be practically obviated; and, also, so that when mounted on an armature drum or core the wire of any one coil or circuit will be free from objectionable contact with or proximity to overlying or underlying portions of wire in any other coil or circuit at the ends of the armature; but it is to be also understood that my frames or formers can be and are employed by me in the construction of coils more or less varied with respect of sundry characteristics in addition to those above referred to; but it is deemed unnecessary to specially describe all of them for the purposes of this specification, it being understood that the prime feature of novelty in each of my armature-coils consists in having at one side of what may be termed its "axial line" lesser external dimensions than the internal dimensions of the opposite portion, so that the smaller portions of one or more coils may be readily passed into and through the larger portions of other coils in mounting them in position on an armature.

The gist of my present invention consists in providing a frame or former with at least two bearing-faces for receiving and shaping the wire as it is laid thereon in proper and regular order, as in the coil required, and in having one of said faces of lesser length than the other, so that one of them will serve for developing what may be termed the "short side" or "small half" of the coil, and the other for developing the long side or large half. In my novel coils the wire at each end is laid or grouped side by side in a flat web, and hence the frame is provided with slots or paths in which portions of the wire extending from one of said bearing-surfaces to the other is laid, bent, and maintained in a flat web parallel with said surfaces and with the axial line of the coil.

The necessity for firmly holding the wire as it is wound or laid involves rigid bearing-surfaces on the frame, and some of these must be movable or detachable for enabling a coil or winding to be readily removed from the frame without undue distortion.

One form of my coiling-frame or former is provided with, first, a set of two or more parallel straight bearing-faces of unequal lengths, upon which the wire at the two sides or effective portions of a coil can be grouped in parallel lines, with one side of the coil longer than the other, the wire at said sides being in one or more layers, but in great variety of arrangement with respect of the position of the wire of any one convolution at each side relatively to the position of a corresponding portion of wire in any other convolution of wire in the same side of the same coil or circuit; second, four bearing-faces or forming-surfaces interposed between said parallel bearing-faces arranged in pairs and oppositely located, upon which the wire at each end of the coil in passing from one side to the other can be bent and grouped side by side in two symmetrically-bent flat webs or single layers; and, third, lateral guiding-paths for the wire in passing from the inner end of an interposed bearing or forming surface to the adjacent end of the other in that pair, each of said paths being between a pair of cheek-pieces and serving to maintain the wire grouped therein in a flat web or single layer substantially at right angles to the adjacent portions of the web developed on said interposed forming-faces. If these straight bearing-surfaces and the interposed bearing or forming faces and said guiding-paths be provided in a coiling-frame or former of this general form, it will be quite immaterial as to the construction of other portions of the frame if certain of the bearing-faces or parts affording said faces be so organized in the frame as to admit of the removal of a coil therefrom without materially impairing its contour or the predetermined arrangement of the wire. In some instances it is desirable that some of the straight parallel faces be so far movable with reference to other portions of the frame that the sides of the coil can be readily separated from said faces; and so, also, in some cases interposed bearing-faces are not necessary for the development of the ends of the coils, as will hereinafter be made apparent in describing one form of my frames, in which the walls of the lateral guiding-paths are removed for releasing a coil. In all cases when interposed bearing or forming faces are employed, they are preferably curved longitudinally, or so shaped as to develop desirable bends in the wire, and also movable, so as to be freely disengaged from the coil preparatory to its removal from the frame; but when these interposed curved bearing-faces are not embodied in the coiling-frame an additional former having similarly-curved surfaces is employed for developing the ends of the coils into desirable curves, as will hereinafter be fully explained.

Referring to the drawings, Figures 1, 2, 3, and 4 illustrate one form of my coiling-frame respectively in plan, side, and two end views. Fig. 5 in perspective illustrates one form of simple armature-coil developed on said frame. Fig. 6 illustrates in end view a more complex form of coil also developed on said frame. Figs. 7, 8, 9, and 10 illustrate another form of my coiling-frame in plan, side, and two end views. Fig. 11 illustrates in side view one form of coil developed on the frame, Fig. 7. Fig. 12 illustrates the coil, Fig. 11, in end view as when it is first removed from the former. Fig. 13 is a diagram illustrating the preferred surface contour of the interposed bearing or forming faces at the sides of the frame. Figs. 14, 15, and 16 illustrate in side view and in two sectional views one of my coiling-frames in which the cheek-pieces swing on hinges. Figs. 17, 18, and 19 illustrate, respectively, in plan, end, and side view one of my winding or coiling frames of a different form, but embodying the main features of my invention. Figs. 20 and 21 illustrate in plan and end views a coil in its preliminary form, as when detached from the frame, Fig. 17. Fig. 22 in plan view illustrates a former on which the preliminary coil, Fig. 20, is bent into final shape for use. Fig. 23 illustrates said former in end view, with a coil lying thereon with its ends properly bent or curved. Fig. 24 illustrates a coil of different contour, the developing of which requires only a modification in the shape and dimensions of the frame, Fig. 17, as indicated in dotted lines, it being understood that the former of Figs. 22 and 23 would be correspondingly modified for bending the ends of this coil.

In Figs. 1 to 4, inclusive, the coiling frame or former consists in part of two side pieces, A A', and two end pieces, $A^2$ and $A^3$, these being varied in size and proportion according to the size and character of armature-coil desired. These sides and ends, when joined, constitute a substantially rectangular rigid frame, serving as a foundation in the coiling-frame or former, and, although these ends and sides may be constructed separately and united by bolts at the corners, as shown, a suitable foundation frame may be formed of a single casting, on which the several other essential parts of the former may be variously mounted, without departure from my invention.

At the middle of each side of the frame there is a vertical transverse opening or slot, $a$ $a'$, each having a rounded surface at the bottom and provided with side walls, $a^2$ and $a^3$, laterally projecting, respectively, from the outer surface of one side of the frame and the inner surface of the other. These slots serve as guiding-paths for the wire and should be of a width corresponding to and but little greater than the diameter of the insulated wire used in each case. These side walls should be detachable, and hence I have made them integral with certain detachable cheek-pieces. These cheek-pieces are curved longitudinally at their under sides, so as to afford curved forming faces or surfaces. There are four of these cheek-pieces $b$ $b'$ and $c$ $c'$, which, in matter of substance, are counterparts, each having an evolute or peculiarly-curved forming-face, $d$, on their lower sides, and each being detachably applied to the frame by means of dowel-pins and thumb-bolts $e$. Two of said cheek-pieces, $b$ and $c$, are applied to the inner surfaces of the two sides of said frame at one side of said slots $a$ $a'$, and at the opposite sides of said slots the cheek-pieces $b'$ and $c'$ are similarly applied to the outer surfaces of the sides of the frame. It will be seen that these curved forming-faces or cheek-pieces are oppositely arranged in pairs $b$ $b'$ and $c$ $c'$, and that adjacent to the inner ends of the forming-faces of each pair the slot $a$ or $a'$ serves as a lateral guiding-path for wire in passing from one face to the oppositely-located face of the same pair. At the top of one end, $A^2$, of the frame there is a single straight vertical forming-face, $f$, having rounded ends, and there are two transverse vertical slots, $f'$, therein for enabling the convenient use of twine for binding the parallel convolutions of a coil together. At the opposite end, $A^3$, of said frame there are two similar forming-faces, $g$ and $g'$, occupying different vertical and horizontal planes, and the upper face, $g'$, is shorter in length than the lower face, $g$, and the latter is inclined slightly inward from its top to its base to enable a proper arrangement of wire thereon. It will be seen that the forming-faces at the sides are interposed between the end faces, and that the straight forming-face $f$ is longer than the straight forming-face $g$, and that these are parallel with each other, thus providing for forming a coil longer at one of its sides than at the other, so that the short side of any one coil can be passed through the long side of any other coil. All of these straight forming faces $f$ $g$ $g'$ have horizontal ledges or surfaces at their bases, as clearly indicated.

Now, referring to the several forming-faces $d$ on the cheek-pieces $b$ $b'$ and $c$ $c'$, it is to be understood that they are so shaped longitudinally as to provide for desirable bends in the wire, and for obtaining the best results the contour of the face is curved, and this curve should be in an evolute line, as indicated in the diagram, Fig. 13. By the adoption of this evolute line specially desirable symmetry is obtained, and I am enabled to closely arrange the several ends of coils formed thereon in mounting them upon an armature; but I find that more or less desirable results will accrue if these forming-faces be otherwise curved or shaped to bend or form the wire, so that, while it will occupy a substantially-similar path, it might not, strictly speaking, be curved—as, for instance, said forming-face might be as indicated in dotted lines in said Fig. 13, so that wire bent or formed thereon would have four, or even less, distinct bends, and be substantially straight between said bends; but I deem such a forming-face the equivalent of a curved face, and it would possess the substantial advantages due to the evolute arrangement of the bends.

In winding I first arrange a straight length of wire (equal to a little more than one-half of a convolution of the coil desired) so that it will project from the outer end of the cheek-piece $c'$ over and beyond the adjacent end portion of the frame, and then I commence to lay the wire beneath said cheek-piece $c'$, thence through the slot $a'$, beneath the cheek-piece $c$, thence up and along the straight bearing-face $g$, beneath the cheek-piece $b$, outward through the slot $a$, beneath cheek-piece $b'$, along the staight bearing-face $f$, beneath cheek-piece $c'$, alongside of the wire already laid, and so on until the desired number of convolutions have been wound, the end projecting through slot $a$ serving as one terminal. Then the initial end is laid along the bearing-face $f$, beneath cheek-piece $b'$, and opposite the slot $a$ it is bent outward to serve as the second terminal.

With the use of the bearing-faces $f$ and $g$ a coil like that shown in Fig. 5 would be produced, in which there are but two convolutions of wire.

With the use of the forming-faces $f$, $g$, and $g'$ a coil would be formed having the same general contour as the coil of Fig. 5, but having, say, four convolutions, as illustrated in end view, Fig. 6, wherein, at the long side $h$ of the coil, the wire is grouped two layers wide and two deep, this having been done on the face $f$, and at the opposite side, $h'$, the wire is shown separated in two parts, each containing two portions of wire side by side; but when these two parts have been gently pressed into proper relations with each other the wire is grouped two wide and two deep, as at the opposite side, it being understood that one of these initially-separated parts was formed on the face $g$ and the other on face $g'$.

Many variations can be made in coils formed on my frames, and the latter are more or less varied in the number and form of the straight bearing-faces at the ends of the frame; but it is believed to be impracticable to illustrate and describe all of these, and, in fact, unnecessary, as the description thus far given will be no doubt ample for guiding persons skilled in the art to the production of coils in great variety in the matter of the arrangement of the convolutions of wire and enable the ready adaptation of the main features of my invention to special requirements in each case. I will, however, describe another of my novel coiling-frames or formers of a somewhat different form, which is adapted to the production of a differently-shaped armature-coil.

Referring to Figs. 7 to 10, inclusive, it will be seen that the coiling-frame has slightly-angular sides B B' and two end pieces, $B^2$ $B^3$. At the two angular sides the curved forming-faces afforded by the cheek-pieces $b$ $c$ $b'$ $c'$ are, as before described, as well as the guiding-paths, at the side slots, $a$ $a'$. In this frame the straight end bearing-face, $i$, and the straight faces $k$ $k'$ are provided at their ends with a series of ledges or steps in regular order, thus locating positively the wire in each convolution of a coil. Over the bearing-face $i$ overhanging strips $i^2$ are secured, but separated at their inner ends, to afford a tying-slot, $i'$, like the corresponding slots, $f'$, of the first frame described. A central longitudinal bar, $l$, provided with an axial opening, $l'$, enables the frame to be rotatively mounted on a rod or shaft for facilitating the operation of coiling. With this frame an armature-coil can be formed having a contour like that illustrated in Fig. 11, and which, on being removed from the frame, would be as shown in end view, Fig. 12, the wire at the side portion, $h$, lying grouped four wide and two deep, and at the opposite side, $h'$, in two groups each four wide and one deep; but these when gently forced into proper relations will also be grouped four wide and two deep. I have found it sometimes desirable to provide the cheek-piece $c$ with an outwardly-projecting ear and the cheek-piece $b'$ with an inwardly-projecting similar ear, both as indicated in dotted lines in Fig. 7, thus affording more extensive side walls for the lateral paths $a$ and $a'$, for better controlling a specially wide grouping of wire. In the coils previously described the terminals are centrally located; but in this coil they are at one side, as shown, because the winding was commenced and terminated at one of the slots near the end of the frame instead of at one of the central slots.

It should be understood that a frame like that shown in Fig. 1 can be employed for winding coils similar to that shown in Fig. 11, except that the ends of the coils so wound would not be inclined outwardly from each side toward the center. In said Fig. 11, $h$ denotes the long side of the coil, and $h'$ the short side. The ends $h^2$ are substantially alike, the wire being grouped side by side in one layer or web at each end in two evolute paths which merge at the center in a similar flat web at $h^3$, which is parallel with the sides of the coil.

It will be seen that in the use of these novel coiling-frames or formers the wire at the ends of the coil can be maintained in a flat web, regardless of the number of convolutions in each coil, and also regardless of the manner of grouping of the wire at the sides or effective portions of the coil and it will also be seen that the wire thus grouped in a flat web at the ends occupies evolute paths toward and from the axis of the coil, when mounted on an armature in a dynamo-electric machine. It will also be seen that a coil developed on said frame is longer at one side than at the other, and that, regardless of the number of convolutions, the small half of one coil can easily be passed within the larger half of any other coil, and that any desired number of counterpart coils can be produced by me for use on any one armature.

It will be clearly obvious that the construction of the frame so as to admit of the movability of the curved forming faces may be indefinitely varied without material departure from my invention. The use of cheek pieces detachably secured in place by dowel-pins and thumb-bolts is found to be fairly convenient; but said cheek-pieces may be hinged with relation to the foundation portion of the frame in various ways, so as to be readily swung into and away from their operative positions and to be properly secured in position for service—as, for instance, as illustrated in Figs. 14, 15, and 16.

In this instance cheek-pieces $b$ and $b'$ are each mounted on movable portions $m$ $m'$ of the sides of the frame, and these are hinged at their lower edges to the main or foundation portion of the frame. The hinges $m^2$ for the cheek-piece $b$ are on the outer side and the hinges $m^3$ for the cheek-piece $b'$ are on the inner side, so that cheek-piece $b$ can be swung laterally outward and downward away from a coil and the cheek-piece $b'$ swung laterally inward and downward. Each cheek-piece may be readily confined in its operative position by means of a sliding bolt, or by simple turn-buttons, as at $m^4$. Various other forms of movable curved forming-faces have been found more or less desirable in practice; but those shown are deemed ample for promptly guiding persons skilled in the art toward attaining the ends sought by me.

As hereinbefore fully indicated, it is essential that some portions of the frame be so far movable that a coil may be detached from the frame; but it is to be understood that one form of my novel frames without the curved cheeks or curved forming-faces, but embodying other portions of my invention, can be effectively employed, and although said frames differ greatly in their general appearance from those already described, they nevertheless contain all of those portions of my invention which pertain to the laying or coiling of the wire, so that coils wound thereon require only to be developed into their finished condition by the use of a separate former, which, like the curved-face cheek-pieces of the frames already described, imparts desirable curvatures to the flat webs at the ends of the coils.

In Figs. 17, 18, and 19 I illustrate one of my frames of the character last referred to, and, in order that it may be the more readily compared in certain essentials with the frame shown in Fig. 1, corresponding parts will be indicated by the use of the same letters of reference. In this frame two end pieces, $n$ $n'$, and a cross-bar, $n^2$, constitute the foundation upon which the other portions are mounted. As in Fig. 1, this frame has one straight bearing-face, $f$, and two straight bearing-faces, $g$ $g'$; but instead of being at opposite ends of a frame, as in Fig. 1, they are side by side. The face $f$ is of greater length than the face $g$ $g'$, and is separated therefrom by a projecting portion of the frame, as at $n^3$. Each end piece, $n$ $n'$, is provided with cheek-pieces $b$ $b'$ and $c$ $c'$, and although they have no curved forming-faces, as in Fig. 1, they afford, as in Fig. 1, between each pair a lateral path or slot, as at $a$ $a'$; and although both cheek-pieces of each pair may be movable, if desired, it is only necessary to move or detach one of each pair for enabling the adjacent portions of a coil to be lifted away from the paths or slots $a$ $a'$, and then the coil may be readily detached from the straight bearing-faces. These pairs of cheek-pieces are oppositely located like those in the frame, Fig. 1, and although these do not perform all of the functions of the curved-face cheek-pieces, they in like manner afford side walls to the slots $a$ $a'$ and maintain the convolutions of wire in flat webs at the ends of the coils. In Fig. 20 a winding of wire is shown in the form developed upon this frame, and in Fig. 21 the same winding is shown in end view after the wire which was laid on the two straight faces $g$ and $g'$ has been pressed together. For completing this wound wire into a coil the sides $h$ and $h'$ are bent away from each other and properly curved at the ends, and this is done on the former C, Figs. 22 and 23. This former has a surface contour corresponding with that of the finished coil desired. The webs $h^3$ of the coil are inserted into the slots $a^4$ and $a^5$, and the two sides thereof are then pressed downward and made to conform to the curved faces $b^2$ and $b^3$, thus curving the ends $h^2$ of the coil as if they had been formed upon the curved cheek-pieces of the frame, Fig. 1. At each slot $a^4$ $a^5$ there is a hinged bar, $a^6$, which crosses the slot and confines the web of the coil therein during the bending operation, said bars being provided with clamping-screws, by which they may be firmly confined in position, and also enabling them to be loosened and swung out of the way for the admission of the webs $h^3$ and the removal of a finished coil from the former.

In Fig. 24 I show a form of coil in which the two sides $h$ and $h'$ are rounded and the ends $h^2$ are angular to the axial line of the coil, and this variation in form will involve only a corresponding variation in the form of the frame, Fig. 17, as clearly indicated therein in dotted lines.

Having thus described my invention, I claim as new and desire to secure by Letters Patent—

1. An armature-coil-winding frame having a bearing-surface on which the wire in one side of an armature-coil may be laid and formed, another bearing-surface of lesser length on which the wire in the opposite side of said coil may be laid and formed, and slots or paths in and through which portions of the wire in the ends of the coil may be laid and formed into a flat web, substantially as described.

2. An armature-coil-winding frame having two or more bearing-faces of unequal lengths, oppositely-located pairs of cheek-pieces, and a slot or path between the cheek-pieces of each pair, substantially as described.

3. In a coiling-frame or former for winding armature coils or circuits, the combination, substantially as hereinbefore described, of two or more straight parallel bearing-faces of unequal length, four bearing or forming faces oppositely arranged in pairs and interposed between two of said parallel faces, and lateral guiding-paths at the adjacent ends of each pair of said interposed bearing-faces.

4. A coiling-frame or former for winding armature coils or circuits, substantially as hereinbefore described, having one or more straight parallel forming or bearing faces of unequal lengths at each end of said frame, upon which wire for the sides or effective portions of a coil can be grouped or massed in straight parallel lines in one or more layers, and having at each side of said frame a movable cheek-piece at the outer surface of said frame, also a similar cheek-piece at the inner surface, said cheeks affording forming-faces on which the wire of the ends of the coil can be grouped side by side in a bent flat web or layer, and also having in each side of said frame a transverse slot, affording a guiding-path for wire extending from the forming-face of one cheek to the face of another and for maintaining that portion of grouped wire in a flat web parallel with the sides of the coil.

5. In a coiling-frame or former for winding detachable armature coils or circuits, a forming-face longitudinally curved in an evolute line, substantially as described, for defining the path of wire in passing from one effective side of a coil across its ends to the opposite side of said coil.

RUDOLF EICKEMEYER.

Witnesses:
JAMES S. FITCH,
CHARLES E. GORTON.